(12) United States Patent
Von Der Heide

(10) Patent No.: US 9,238,195 B2
(45) Date of Patent: Jan. 19, 2016

(54) PROCESS AND APPARATUS FOR REDUCING THE CONTENT OF NITROGEN OXIDES

(75) Inventor: Bernd Von Der Heide, Essen (DE)

(73) Assignee: MEHLDAU & STEINFATH UMWELTTECHNIK GMBH, Essen (DE)

( * ) Notice: Subject to any disclaimer, the term of this patent is extended or adjusted under 35 U.S.C. 154(b) by 212 days.

(21) Appl. No.: 14/124,936

(22) PCT Filed: Dec. 2, 2011

(86) PCT No.: PCT/IB2011/003106
§ 371 (c)(1),
(2), (4) Date: Mar. 7, 2014

(87) PCT Pub. No.: WO2012/168758
PCT Pub. Date: Dec. 13, 2012

(65) Prior Publication Data
US 2015/0290583 A1 Oct. 15, 2015

(30) Foreign Application Priority Data

Jun. 9, 2011 (DE) .......................... 10 2011 105 142
Jun. 20, 2011 (DE) .......................... 10 2011 105 419

(51) Int. Cl.
*B01D 53/56* (2006.01)
*B01D 53/74* (2006.01)
*B01D 53/79* (2006.01)
*B01D 53/76* (2006.01)

(52) U.S. Cl.
CPC ................ *B01D 53/76* (2013.01); *B01D 53/56* (2013.01)

(58) Field of Classification Search
CPC ......... B01D 53/74; B01D 53/79; B01D 53/56
USPC ......................................................... 423/235
See application file for complete search history.

(56) References Cited

U.S. PATENT DOCUMENTS

| 4,115,515 A * | 9/1978 | Tenner .................... B01D 53/56 423/235 |
| 5,118,481 A * | 6/1992 | Lyon ...................... B01D 53/56 423/235 |
| 2013/0064744 A1* | 3/2013 | Yacoub .................. F01N 3/206 423/212 |

* cited by examiner

*Primary Examiner* — Timothy Vanoy
(74) *Attorney, Agent, or Firm* — Edward E. Sowers; Brannon Sowers & Cracraft PC

(57) ABSTRACT

The invention provides a process for treating nitrogen oxide-containing offgases from industrial processes, e.g. flue gases, for the purposes of removing and/or separating out the nitrogen oxides and/or for the purposes of reducing the nitrogen oxide content by means of chemical reduction of the nitrogen oxides, in particular a process for the removal of nitrogen oxides from offgases from industrial plants, wherein at least two different nitrogen-containing reducing agents are brought into contact with the nitrogen oxide-containing offgases or introduced into the stream of the nitrogen oxide-containing offgases. The present invention further provides an apparatus (plant) for carrying out this process.

18 Claims, 1 Drawing Sheet

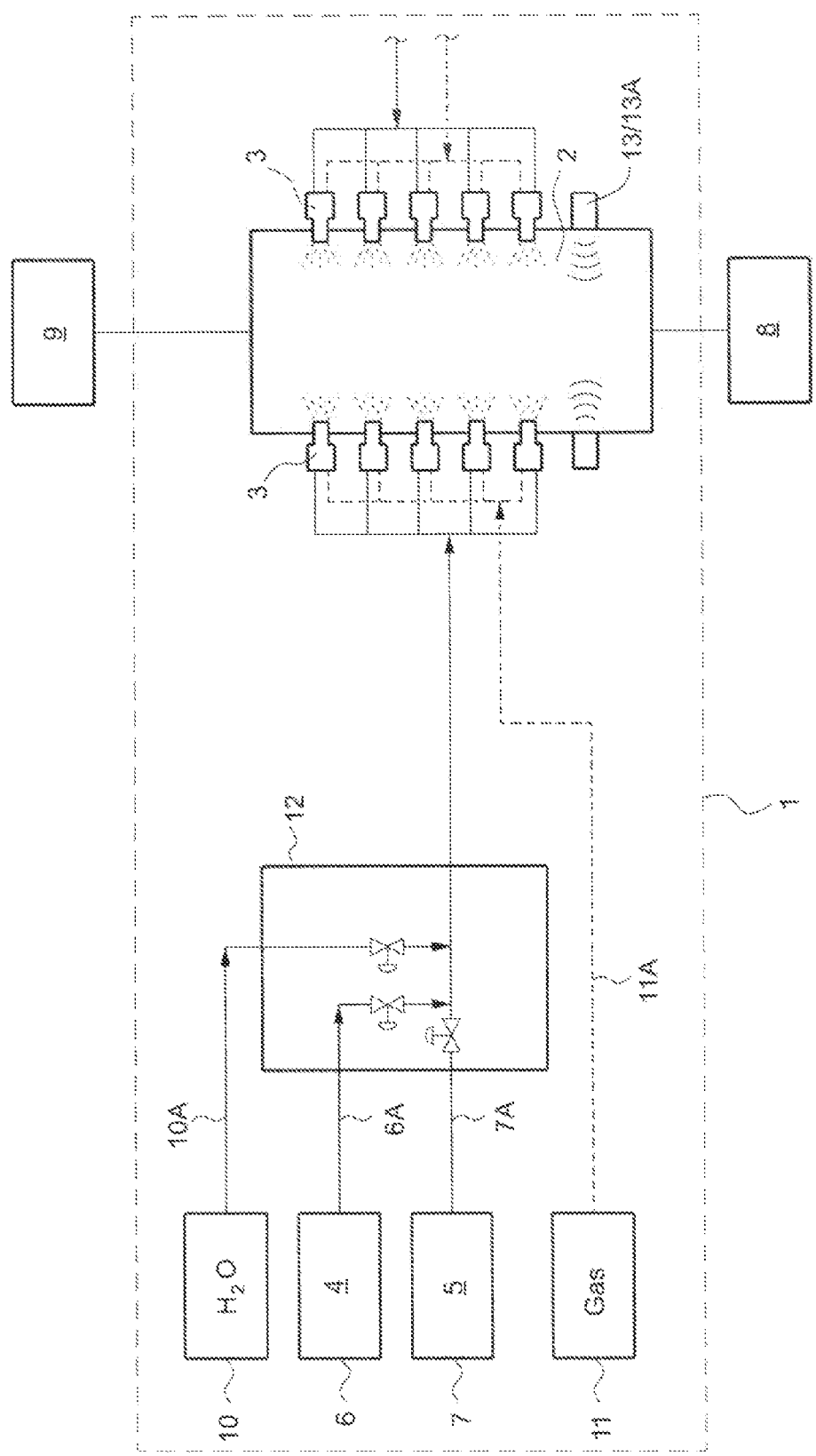

PROCESS AND APPARATUS FOR REDUCING THE CONTENT OF NITROGEN OXIDES

CROSS-REFERENCES TO RELATED APPLICATIONS

This application is a National Stage filing of International Application PCT/IB 2011/003106, filed Dec. 2, 2011, claiming priority to German Applications No. DE 10 2011 105 142.6 filed Jun. 9, 2011, and DE 10 2011 105 419.0 filed Jun. 20, 2011, entitled "PROCESS AND APPARATUS FOR REDUCING THE CONTENT OF NITROGEN OXIDES." The subject application claims priority to PCT/IB 2011/003106, and to German Applications No. DE 10 2011 105 142.6 and DE 10 2011 105 419.0, and incorporates all by reference herein, in their entirety.

BACKGROUND OF THE INVENTION

The present invention relates to the technical field of treatment of offgases, in particular the treatment of offgases containing nitrogen oxides.

The present invention relates in particular to a process for treating nitrogen oxide-containing offgases from industrial processes, e.g. flue gases, for the purposes of removing or separating out the nitrogen oxides and/or for the purposes of reducing the nitrogen oxide content by means of chemical reduction of the nitrogen oxides. In particular, the present invention relates to a process for removing nitrogen oxides from offgases from industrial plants, for example power stations, in particular combined heat-power stations, or waste incineration plants.

Furthermore, the present invention relates to an apparatus for treating nitrogen oxide-containing offgases from industrial processes, e.g. flue gases, for the purposes of removing or separating out the nitrogen oxides or else for the purposes of reducing the nitrogen oxide content by means of chemical reduction of the nitrogen oxides.

Combustion reactions in the presence of air form metastable, generally toxic and reactive oxides of nitrogen, known as nitrogen oxides. The formation of nitrogen oxides occurs to an increased extent as a result of the combustion or thermolysis and pyrolysis of organic and inorganic nitrogen-containing compounds, which occurs in large-scale firing plants such as combined heat-power stations or waste incineration plants.

Nitrogen oxides, in particular the compounds nitrogen monoxide and nitrogen dioxide known under the term nitrous gases, which are also denoted by the abbreviated formula $NO_x$, are not only toxic and lead to irritation and damage to the pulmonary system but also increase the formation of acid rain since they react with moisture to form acids.

However, the liberation of nitrogen oxides is also problematical for further reasons of environmental protection since firstly they promote the formation of smog and of harmful ozone near the ground and secondly act as greenhouse gases and increase global warming.

Owing to the negative effects of nitrogen oxides on health and the environment and not least due to the economic damage associated therewith, attempts have been made for a long time to minimize or prevent the liberation of nitrogen oxides in combustion processes. In the case of passenger cars, this is achieved, for example, by the use of catalysts which allow virtually complete removal of the nitrogen oxides from the exhaust gases.

To reduce the emission of nitrogen oxides from industrial plants, in particular large industrial firing plants, various processes for nitrogen oxide removal or denitrification (deNOx) which alone or in combination are supposed to bring about an effective reduction or avoidance of nitrogen oxides in offgases, in particular flue gases, have been developed in view of the prevailing legal position and also economic considerations.

The processes and measures for reducing the nitrogen oxide content of offgases, in particular flue gases, can be divided into primary measures and secondary measures.

In the case of the primary measures, the combustion process is controlled in such a way that the nitrogen oxide content of the resulting offgases is as low as possible; the nitrogen oxides should, so to say, not be formed at all. Primary measures include, for example, flue gas recirculation, in which the flue gas is recirculated to the combustion zone, and also air and fuel stages in which the combustion is controlled in such a way that various combustion zones having different oxygen concentrations are obtained. In addition, the formation of nitrogen oxides in flue gases can also be reduced by addition of additives or by quenching, i.e. by spraying in water to reduce the temperature during the combustion process.

In contrast to primary measures, which are intended to reduce the formation of nitrogen oxides, the use of secondary measures is intended to reduce the concentration of the nitrogen oxides in the offgases, in particular flue gases. Secondary measures include, for example, separation processes in which the nitrogen oxides are chemically bound or scrubbed out of the flue gas stream. However, a disadvantage of the separation processes is that large amounts of waste products, for example process water, which are often contaminated with further constituents of the flue gas are obtained and have to be disposed of, which costs money.

For this reason, secondary measures employed in modern industrial plants are usually processes which are based on reduction of the nitrogen oxides to elemental nitrogen and lead to only small amounts of waste products, with a distinction generally being made between catalytic processes and noncatalytic processes.

Selective catalytic reduction (SCR) of the nitrogen oxides encompasses catalytic processes in which the nitrogen oxides are converted into elemental nitrogen with the aid of metal catalysts. In general, the best denitrification values are obtained by means of SCR processes, but the use of the catalyst makes the process significantly more expensive and less economically viable. In addition, the plants for carrying out the SCR process are extremely expensive not only to acquire but also to maintain since the sensitive catalysts have to be treated or replaced at short time intervals. Particularly in large firing plants whose fuel composition can often be determined only unsatisfactorily, for example waste incineration plants, there is always a risk of poisoning of the catalysts by impurities in the flue gas. This risk can be reduced only by means of additional costly measures.

Selective noncatalytic reduction (SNCR), on the other hand, is based on the thermolysis of nitrogen compounds, in particular ammonia or urea, which then react in a comproportionation reaction with the nitrogen oxides to form elemental nitrogen.

Compared to selective catalytic reduction, selective noncatalytic reduction is significantly cheaper to carry out: thus, the costs of acquiring and maintaining SNCR plants are just from 10 to 20% of the costs of corresponding SCR plants.

However, a problem with SNCR processes is that their effectiveness is less than the effectiveness of catalytic processes, so that, for example, in the event of a further reduction in the legally permitted limit values for nitrogen oxides in offgases, in particular flue gases, most SNCR plants will no longer be able to operate.

A further disadvantage of processes based on the selective noncatalytic reduction of nitrogen oxides is that the reducing agent has to be used in excess and does not react completely, so that the offgas contains an ammonia loading which is sometimes not insignificant. Excess ammonia in the offgas either has to be separated off or its content has to be reduced by means of process engineering measures to such an extent that release of the offgas stream into the environment is possible.

In addition, there are also processes which are based both on a catalytic mode of action and also on the use of reducing agents, but these processes, too, cannot overcome the in-principle disadvantages of the respective processes (high costs for the use of catalytic processes and low effectiveness for the use of reducing agents).

BRIEF SUMMARY OF THE INVENTION

It is therefore an object of the present invention to provide a process and an apparatus or plant for treating nitrogen oxide-containing offgases from industrial processes, e.g. flue gases, for the purposes of removing or separating out the nitrogen oxides and/or for the purposes of reducing the nitrogen oxide content by means of chemical reduction of the nitrogen oxides, with the abovementioned problems and disadvantages occurring in the prior art being at least largely avoided or at least made less severe.

A particular object of the present invention is to provide a process and an apparatus or plant suitable for carrying out this process, by means of which nitrogen oxides can be removed from offgases from industrial plants, with the efficiency of a selective catalytic reduction process being achieved at least initially but at costs comparable to a conventional selective noncatalytic reduction.

The above object is achieved according to the invention by a process according to the disclosure herein; further advantageous developments and embodiments of the process of the invention are similarly provided.

The present invention further provides an apparatus or plant according to the disclosure herein; further, advantageous developments and embodiments of this aspect of the invention are also provided.

It goes without saying that characteristics, features, embodiments and variants and also advantages or the like which are in the following, for the purposes of avoiding unnecessary repetitions, mentioned only for one aspect of the invention naturally also apply analogously to the other aspects of the invention without this needing to be explicitly mentioned.

Furthermore, it goes without saying that in the case of indication in the following of values, numbers and ranges, the respective values, numbers and ranges indicated are not to be construed as a restriction; it will be clear to a person skilled in the art that in individual cases or for particular uses deviations can be made from the indicated ranges or figures without going outside the scope of the present invention.

In addition, all values and parameters or the like indicated in the following can in principle be measured or determined using standardized or explicitly indicated methods of determination or else using methods of determination which are well known to a person skilled in this field.

Subject to the above, the present invention will be described in more detail below.

BRIEF DESCRIPTION OF THE DRAWINGS

FIG. 1 shows the apparatus 1 according to the invention for carrying out a process according to the invention.

DETAILED DESCRIPTION OF THE INVENTION

The present invention accordingly provides, according to a first aspect of the present invention, a process for treating nitrogen oxide-containing offgases from industrial processes, e.g. flue gases, for the purposes of removing and/or separating out the nitrogen oxides and/or for the purposes of reducing the nitrogen oxide content by means of chemical reduction of the nitrogen oxides, in particular a process for removing nitrogen oxides from offgases from industrial plants, wherein at least two different nitrogen-containing reducing agents are brought into contact with the nitrogen oxide-containing offgases or are introduced into the stream of the nitrogen oxide-containing offgases.

For the purposes of the present invention, the nitrogen oxides are reduced by chemical reaction with the reducing agent to form elemental nitrogen; this firstly allows effective reduction of the nitrogen oxide content of the resulting offgases to be achieved and secondly no liquids and solids contaminated with flue gas constituents are obtained, as is the case, for example, in separation reactions, which liquids and solids subsequently have to be disposed of in a complicated and costly manner.

The deliberate use of at least two different nitrogen-containing reducing agents which, for example, have different reaction kinetics, in particular reaction rate, and/or different temperatures ranges for an optimal reducing effect allows the reduction of the nitrogen oxides in the offgases, in particular flue gases, to be adapted individually and flexibly and additionally makes it possible to achieve extremely effective removal of nitrogen oxides from the offgases. In particular, the process can react quickly to fluctuations in the nitrogen oxide content of the flue gases, as a result of which a smaller amount of reducing agents has to be used and/or improved reduction of the nitrogen oxide content can be achieved.

The process of the invention surprisingly allows significantly more efficient removal of nitrogen oxides from offgases, in particular flue gases, and its efficiency or effectiveness is comparable to the efficiency of catalytic reduction processes.

In addition, the use of two different nitrogen-containing reducing agents likewise surprisingly consumes smaller amounts of reducing agent than, for example, the use of only a single reducing agent. When, for example, aqueous ammonia solutions and urea solutions are used together, significantly smaller amounts of reducing agents are consumed than in the case of the sole use of either ammonia or urea.

The process of the invention thus has a significantly higher efficiency than the processes known hitherto from the prior art and can be carried out inexpensively and flexibly.

Furthermore, the corrosion of plant parts occurring in SNCR processes of the prior art, as is observed, in particular, when urea is used as reducing agent, can be avoided by means of the process of the invention.

The nitrogen oxides removed first and foremost in the process of the present invention are predominantly nitrous gases, i.e. nitrogen monoxide and nitrogen dioxide. However, further nitrogen oxides are also reliably removed from the offgas stream.

The process of the invention, in particular the reduction of the nitrogen oxides, is generally carried out in the absence of a catalyst. Thus, the high acquisition and maintenance costs for a catalyst for the reduction of the nitrogen oxides do not occur in the process of the invention.

The process of the invention is preferably carried out as a selective noncatalytic reduction, in particular as an SNCR process.

In the selective noncatalytic reduction (SNCR) of nitrogen oxides, reducing agents are usually sprayed as aqueous solution (e.g. aqueous ammonia or aqueous urea solutions) or in gaseous form (for example ammonia) into the hot offgases or flue gases. The reducing agents then react with the nitrogen oxides, as indicated for the example of the reducing agents ammonia and urea with the aid of the reaction equations (1) and (2) below, to form molecular nitrogen, water and carbon dioxide.

$$(NH_3)_2CO + 2NO + 1/2O_2 \rightarrow 2N_2 + CO_2 + 2H_2O \quad (1)$$

$$4NH_3 + 4NO + O_2 \rightarrow 4N_2 + 6H_2O \quad (2)$$

The optimal temperature range in which significant reduction of the nitrogen oxides is achieved is, depending on the flue gas composition, usually in the range from 900 to 1100° C. Above this temperature range, ammonia is oxidized to an increasing extent, i.e. addition nitrogen oxides are formed.

At temperatures below this range, the reaction rate is reduced, as a result of which ammonia breakthrough occurs and can lead, along the further path of the flue gas, to formation of ammonia salts and therefore to secondary problems such as corrosion; the ammonia breakthrough should therefore be kept as low as possible.

The term ammonia breakthrough refers in particular to the part of the ammonia which does not react with the nitrogen oxides to form elemental nitrogen. The ammonia originates either from excessive introduction of ammonia or is a degradation product formed by thermolysis of nitrogen-containing reducing agents, for example urea.

For most applications, either urea or aqueous ammonia has hitherto been used as reducing agent. To achieve optimal removal of nitrogen oxides with minimal ammonia breakthrough, the reducing agent has to be uniformly mixed with the flue gases in the optimal temperature range. To achieve the impulse for complete mixing, a considerably higher energy input is required for aqueous ammonia than for urea, since ammonia has a significantly higher vapour pressure.

In addition, aqueous solutions of urea and ammonia display different reaction kinetics due, in particular, to the urea dissolved in water being able to be dissociated into reactive free radicals only when the water which surrounds the urea particles has been completely vaporized, which is why a high penetration depth into the offgases is ensured with a relatively low energy input.

When, on the other hand, aqueous ammonia solutions are used, the ammonia vaporizes from the individual water droplets immediately after entry into the flue gases, so that the reaction takes place preferentially in the vicinity of the reactor walls. Thus, the partial pressure of ammonia is 1 bar at as low as 38° C. The impulse necessary for the optimal penetration depth of the reducing agents can in the case of the then gaseous ammonia be achieved only at a higher energy input because of the lower mass compared to a water droplet, so that the respective amount of steam or air has to be increased significantly. In addition to the higher operating costs incurred by the higher energy consumptions, the capital costs for a plant operated using aqueous ammonia are significantly higher because of the safety requirements, since ammonia is a toxic gas which dissolves readily in water at ambient temperature.

Aqueous ammonia is therefore assigned to the water pollution class 2 and in addition is subject to the technical guidelines for steam boilers because of the high hazard potential for the environment.

Owing to the chemical bonding of ammonia in the urea molecule, urea solutions can, in contrast, be heated to 106° C. without ammonia gas being given off. The decomposition of urea into ammonia gas and carbon dioxide gas commences only at 130° C. and reaches a maximum at about 380° C. Since these high temperatures cannot be reached during storage, the safety precautions necessary for aqueous ammonia are not required. According to the German water management law (WHG), urea solution is assigned only to the water hazard class 1 (i.e. it merely has to be ensured that urea cannot get into surface and subterrain water, for which purpose a collection pan for the storage tank is sufficient).

However, urea solutions have the disadvantage that in the event of too much urea being introduced, this deposits in solid form on parts of the plant and leads to undesirable corrosion. This is all the more important since plants for carrying out SNCR processes are installed relatively close after the combustion chambers, i.e. upstream of the heat exchangers which are usually present. In the case of high loads or high power of the combustion vessel, injection of the urea solution into the region of the heat exchanger may then be necessary to allow efficient reduction of the nitrogen oxides. However, this incurs the risk that solid urea will deposit on the heat exchangers and thus lead to corrosion of the parts, which reduces the life of the plant and considerably increases the operating costs.

It is also generally provided, for the purposes of the present invention, for the contacting with or introduction of the reducing agents to be carried out in such a way that the reducing agents react with the nitrogen oxides, in particular reduce the nitrogen oxides, preferably to elemental nitrogen.

In addition, it has been found to be useful for the different reducing agents to be selected and used in such a way that they in each case react with the nitrogen oxides with comproportionation to form elemental nitrogen. The comproportionation of nitrogen oxides and nitrogen-containing reducing agents to form elemental nitrogen and further preferably gaseous components prevents the formation of further waste products which have to be disposed of in a costly way.

Particularly good results are obtained according to the present invention when the different reducing agents react under different reaction conditions with the nitrogen oxides, in particular at different temperatures or under different kinetic and/or thermodynamic conditions.

The different reducing agents therefore preferably differ not only in terms of their chemical composition but also in their physical properties or their preferred reaction temperatures and reaction rates. This makes it possible to create a new type of reducing reagent which can be matched individually and flexibly to the respective use by targeted mixing of the at least two different reducing agents. Ideally, the properties of the reducing agents used differ to such an extent that a very broad optimal effect range can be obtained by mixing them.

As regards the introduction of the reducing agents into the offgases containing nitrogen oxides, it has been found to be advantageous to use at least one reducing agent in the form of an aqueous solution. However, even better results are obtained when all reducing agents are used in the form of aqueous solutions. The use of aqueous solutions and targeted variation of the concentrations of reducing agents in the respective solutions enable the penetration depth of the reducing agents into the flue gas stream to be controlled in a targeted way, which makes tailored and efficient use of the reducing agents possible.

As different reducing agents, preference is given to using firstly ammonia and secondly urea, in particular in the form of their aqueous solutions.

The use of ammonia solutions has the advantage that they are inexpensive to procure on an industrial scale, as a result of which the process of the invention can be carried out very inexpensively, and the ammonia vaporizes immediately from the aqueous solution and reacts with the nitrogen oxides close to the reactor wall. However, the latter advantage is also a disadvantage since it is often difficult or impossible to achieve a penetration depth into the flue gas stream which allows efficient reduction of the nitrogen oxides when using ammonia solutions.

Urea solutions, on the other hand, have the advantage that a high penetration depth into the flue gas stream can be achieved when they are used, since the urea is decomposed into free $NH_2$ radicals and can react with the nitrogen oxides only after vaporization of all the water. However, on the other hand, urea solutions incur the risk of corrosion of plant parts, in particular when they are introduced in the vicinity of the heat exchangers.

However, targeted combination of the two abovementioned reducing agents, in particular at sites of action which are advantageous in each case, enables the respective disadvantages of the individual reducing agents to be avoided and only the advantages to be exploited.

Both ammonia solutions and urea solutions can readily be stored in appropriately designed tanks, and it can be provided for the respective solutions to be diluted further with water before or after any mixing which may take place.

When ammonia is used as one of the reducing agents for the purposes of the present invention, the ammonia is preferably provided or used in the form of an in particular aqueous solution containing from 10 to 35% by weight, in particular from 15 to 30% by weight, preferably from 20 to 30% by weight, more preferably about 25% by weight, of $NH_3$, based on the solution.

If urea is used as one of the reducing agents for decreasing the nitrogen oxide content of the offgases, it has been found to be advantageous for the purposes of the present invention for the urea to be provided or used in the form of an in particular aqueous solution containing from 10 to 50% by weight, in particular from to 50% by weight, preferably from 30 to 50% by weight, more preferably from 40 to 45% by weight, of urea, based on the solution.

It can likewise be provided for the aqueous urea solution or the aqueous ammmoniacal solution to be admixed with additional water before introduction of the solution(s) into the offgas stream.

Both ammonia solutions and urea solutions are commercially available in the abovementioned concentration ranges and can readily be stored. The optional additional addition of further process water to the respective base mixtures allows targeted setting of the penetration depth of the reducing agents into the flue gas and also leads to cooling of the flue gas to the temperatures necessary for the reduction and additionally allows precise setting of the droplet size of the solutions of the reducing agents introduced into the offgas stream. This likewise has a positive influence on the reaction kinetics.

As regards the introduction of the reducing agents into the offgases containing nitrogen oxides, it can also be provided for the different reducing agents, in particular ammonia and urea, to be introduced at different times and/or physically separately into the offgas stream.

However, it can equally well be provided for the different reducing agents to be introduced together into the offgas stream, in particular after prior mixing.

To achieve a very efficient and effective reduction of the nitrogen oxides in the offgases, it has been found to be advantageous for the different reducing agents to be introduced either at different times and/or physically separately or together after prior mixing into the flue gas stream during the course of the process.

The process of the invention allows extremely flexible introduction, which can be matched to the respective process conditions, of the reducing agents into the offgas stream, in particular flue gas stream. It is possible for the reducing agents to be used individually or else as mixtures during the course of the process, i.e. it is possible to change between introduction of a single reducing agent and introduction of mixtures of reducing agents during the course of the process. Apart from this separation in time of the introduction of the reducing agents or mixtures thereof, it is also possible for the reducing agents or mixtures thereof to be introduced in different places. For this purpose, for example, a single reducing agent can be introduced at one place in the reactor, while the other reducing agent or mixture of reducing agents is introduced at another place.

When ammonia and urea are used as reducing agents for the purposes of the present invention, particularly good results can be achieved when ammonia and urea are introduced in a weight ratio of ammonia/urea of from 99:1 to 1:99, in particular from 95:5 to 5:95, preferably from 9:1 to 1:9, more preferably from 7:1 to 1:7, even more preferably from 4:1 to 1:6, particularly preferably from 2:1 to 1:5, into the offgas stream. This applies particularly when ammonia and urea are introduced together. Within the abovementioned ranges, a particularly high efficiency in the removal of nitrogen oxides from offgases and in a synergistic action of ammonia and urea is observed and is reflected not only in a significant reduction of the nitrogen oxides but also in a significantly lower consumption of reducing agents.

The introduction of the reducing agents into the offgases containing nitrogen oxides can be effected by means of many technical measures. However, it has been found to be useful for the purposes of the present invention for the reducing agents to be introduced in finely divided form into the offgas stream, in particular sprayed in or introduced in atomized form. Atomized introduction in particular can effect fine dispersion of the reducing agents together with an excellent penetration depth of the reducing agents into the offgas stream or flue gas stream, which makes particularly effective reduction of the nitrogen oxides possible.

It has been found to be advantageous for the reducing agents to be introduced into the offgas stream by means of atomized introduction devices, in particular atomized introduction lances. The pressure required for atomized introduction is usually generated by means of compressed air or steam.

Here, it is possible for each atomized introduction device to have one or more, in particular from 1 to 20, preferably from 1 to 15, preferably from 1 to 10, particularly preferably from 1 to 5, nozzles for introduction of the reducing agents into the offgas stream. A plurality of nozzles per atomized introduction device achieves particularly fine and uniform distribution of the reducing agents in the offgas stream.

In this respect, it has also been found to be advantageous for the atomized introduction devices to be arranged in from 1 to 10, in particular from 1 to 7, preferably from 1 to 5, atomized introduction planes. The arrangement of the atomized introduction devices in atomized introduction planes makes it possible to ensure that the entire reactor cross section or the entire width of the flue gas stream can be covered by the reducing agents.

It is possible for each atomized introduction plane to have from 1 to 20, in particular from 1 to 15, preferably from 1 to 12, atomized introduction devices.

In general, the reducing agents are introduced into the flue gas stream via from 1 to 200, in particular from 2 to 100, preferably from 5 to 60, atomized introduction devices.

For the purposes of the present invention, it has been found to be particularly advantageous for the atomized introduction devices to be controlled individually and/or in groups, preferably individually.

Particularly good results are achieved when the exit of the reducing agents from the atomized introduction devices is controlled individually for each atomized introduction device and/or for groups of atomized introduction devices. The individual atomized introduction devices can preferably be regulated individually or at least in groups since the offgas stream, in particular the flue gas stream, is not homogeneous but is subject to great variations in temperature and composition over space and time. To ensure particularly efficient use of the reducing agents, the atomized introduction devices are therefore advantageously able to be regulated individually, i.e. the atomized introduction devices can advantageously be brought into operation or switched off individually, and the pressure and thus the penetration depth of the reducing agents into the offgas stream can also be regulated individually for each atomized introduction device. It is particularly advantageous not only for the individual atomized introduction devices to be regulated individually in respect of their use and the atomized introduction pressure, but also for the composition of the injected reducing agents, i.e. either individual reducing agents or mixtures thereof, to be able to be controlled individually and matched to the respective conditions.

Although the abovementioned individual controllability of all atomized introduction devices in terms of their operating parameters and the composition of the reducing agents is preferred according to the invention, it also increases the process engineering outlay and thus the costs of denitrification.

Likewise very good results, but with a significantly reduced process engineering outlay, are obtained when the composition or the mixing ratio of the reducing agents is set jointly for all atomized introduction devices or else is at least set jointly for all atomized introduction devices of an atomized introduction plane but the individual atomized introduction devices can be regulated individually in respect of the atomized introduction pressure and the operating conditions or operating ratios.

At relatively uniform offgas flows and/or offgas flows which are in accordance with expectations, very good results can still be achieved when the atomized introduction devices are controlled in groups. Here, a group of atomized introduction devices is a defined and/or jointly controllable and/or combined unit of a plurality of atomized introduction devices, in particular atomized introduction lances.

As regards the temperatures in carrying out the process of the invention, these can vary within a wide range. However, particularly good results can be achieved in the framework of the present invention at temperatures in the range from 750 to 1200° C., in particular from 800 to 1150° C., preferably from 850 to 1100° C. Particularly good results are achieved in these temperature ranges, especially when using aqueous ammonia or urea solutions.

Likewise, particularly good results are obtained in the framework of the present invention when the introduction of the reducing agents into the offgases is controlled in a targeted manner and flexibly.

In an embodiment which is preferred according to the invention, the introduction of the reducing agents into the offgas stream, in particular the amount thereof and/or the point in time of the introduction, is therefore controlled via determination of the offgas temperature and/or the residual nitrogen oxide content of the pure gas obtained after the treatment.

Here, the introduction of the reducing agents into the offgas stream can be controlled via an evaluation of the load signal and/or via determination of the offgas temperature and/or via comparison of a measured value for the residual nitrogen oxide content of the pure gas obtained after the treatment with a prescribed intent value. In addition, it is possible for the ammonia breakthrough also to be determined and likewise be taken into account in the process control.

For the purposes of the present invention, a load signal is the indication of the respective load at which a combustion apparatus, for example a large firing plant, in particular a combustion vessel, is operated. The load corresponds to the power released by the combustion apparatus and is usually reported in per cent, with full load (100%) corresponding to the power for which the combustion apparatus is designed at optimal combustion and charging.

For the purposes of the present invention, it has also proved to be particularly advantageous for the temperature of the offgases to be determined during the process at least at defined and/or predetermined measurement points and/or for at least one temperature profile of the offgases to be established, in particular in the form of one or more planes, especially by means of acoustic and/or optical temperature measurement, preferably acoustic temperature measurement. The determination of a location- and time-dependent temperature profile of one or more planes of the offgas stream allows targeted control of the individual atomized introduction devices, as a result of which, firstly, the reducing agents can be used effectively so that effective reduction of the nitrogen oxides takes place and, secondly, over introduction of the reducing agents based on the nitrogen oxides, which would lead to increased ammonia breakthrough, can be avoided.

Methods of acoustic temperature measurement, in particular acoustic gas temperature measurement, by means of which the true gas temperatures are determined over the firing space cross section or the cross section of the offgas treatment apparatus close to the atomized introduction locations and temperature profiles are calculated have been found to be particularly useful in this context.

A system which is preferably used according to the invention consists of mechanically and electrically similar sender and receiver units which are installed on the walls of the offgas treatment apparatus immediately downstream of the firing space, in particular the combustion vessel, and an external control unit. When the measurement is carried out, a valve (e.g. magnetic valve) opens a compressed air line on the sender side, thus generating acoustic signals. The signals are recorded simultaneously on the sender and receiver sides. The sound transmission time can be determined from the digitized signals. Since the distance is known, the speed of sound is obtained and is used to calculate a temperature, known as the path temperature. A plurality of sender/receiver units acting in combination in a plane gives multipath configurations by means of which the two-dimensional temperature distribution in a plane can be determined directly and without a delay.

In this context, it has been found to be advantageous for the offgas stream to be divided into sections on the basis of the measured temperatures of the offgases and/or the measured temperature profile of the offgases, with defined individual atomized introduction devices and/or defined groups of atomized introduction devices being assigned to the sections. This ensures that the reducing agent gets to the places which are most effective for a reaction even in the case of rapidly changing offgas temperatures and the plant is always operated in the optimal range in respect of the degree of nitrogen oxide removal, ammonia breakthrough and reducing agent consumption.

In an embodiment which is particularly preferred according to the invention, the atomized introduction devices are controlled, in particular individually or in groups, on the basis of the measured temperatures of the offgases and/or the measured temperature profile of the offgases and/or the load signal and/or a comparison between a measured value for the residual nitrogen oxide content of the pure gas obtained after the treatment and a prescribed intended value.

It is likewise possible for the weight ratios of the reducing agents, in particular the weight ratios of the mixtures of reducing agents, and/or the concentrations of the aqueous solutions of the reducing agents to be set to identical values for all atomized introduction devices and/or to be set individually for individual, in particular each atomized introduction device and/or for each group of atomized introduction devices, preferably for each atomized introduction device. Particularly flexible and rapid adaptation of the reducing agent mixtures to the prevailing process conditions is achieved in this way.

As regards the amount of reducing agents relative to the amounts of nitrogen oxides in the offgases, this can vary within a wide range. However, particularly good results are obtained according to the present invention when the reducing agents, in particular ammonia and urea, are introduced into the offgas stream in such amounts that the molar ratio, in particular the ratio of equivalents, of total reducing agents used to nitrogen oxides to be reduced is set to a value in the range from 1:1 to 5:1, in particular from 2:1 to 4:1, preferably about 2.5:3.5. The ratio of equivalents relates to the equivalents of ammonia, viz. the number of ammonia molecules or free $NH_2$ radicals provided by the nitrogen-containing reducing agents used. Thus, one molecule of urea corresponds to two equivalents of ammonia since one molecule of urea disintegrates into two free $NH_2$ radicals on thermolysis.

The process of the invention as indicated above makes a significantly improved reduction of the nitrogen oxides in offgases with a simultaneous reduction in the amounts of reducing agents used compared to processes of the prior art possible.

The present invention further provides, according to a second aspect of the present invention, an apparatus (plant) for treating nitrogen oxide-containing offgases from industrial processes, e.g. flue gases, for the purposes of removing and/or separating out the nitrogen oxides and/or for the purposes of reducing the nitrogen oxide content by means of chemical reduction of the nitrogen oxides, in particular an apparatus (plant) for removing nitrogen oxides from offgases from industrial plants, preferably for carrying out a process as has been described above, wherein the apparatus comprises:

(a) a reactor for contacting and/or reacting at least two different reducing agents with the nitrogen oxide-containing offgases, where the reactor has a plurality of atomized introduction devices, in particular atomized introduction lances, for the introduction, in particular introduction in atomized form, of at least two different nitrogen-containing reducing agents, in particular ammonia and urea, where the atomized introduction devices can be regulated individually and/or in groups, preferably individually, (b) at least one first reservoir, in particular a first stock vessel, for stocking and/or supplying at least one first reducing agent, which is assigned, in particular, to the reactor and connected, preferably via at least one feed line, to the atomized introduction devices, and (c) at least one second reservoir, in particular a second stock vessel, for stocking and/or supplying at least one second reducing agent, which is different from the first reducing agent, which is assigned, in particular, to the reactor and connected, preferably via at least one feed line, to the atomized introduction devices.

As indicated above in connection with the process of the invention, the outflow of the reducing agents from the atomized introduction devices can be able to be regulated individually for each atomized introduction device and/or for groups of atomized introduction devices.

As likewise described above in the context of the process of the invention, each atomized introduction device can have one or more, in particular from 1 to 20, preferably from 1 to 15, preferably from 1 to 10, particularly preferably from 1 to 5, nozzles.

In an embodiment which is preferred according to the invention, the apparatus has from 1 to 200, in particular from 2 to 100, preferably from 5 to 60, atomized introduction devices.

It has likewise been found to be advantageous for the atomized introduction devices to be arranged in from 1 to 10, in particular from 1 to 7, preferably from 1 to 5, atomized introduction planes.

In this context, particularly good results are obtained when each atomized introduction plane has from 1 to 20, in particular from 1 to 15, preferably from 1 to 12, atomized introduction devices.

As stated above in the description of the process of the invention, the atomized introduction devices can be configured for the introduction, in particular spraying-in, preferably atomized introduction, of aqueous solutions of the reducing agents, in particular aqueous ammonia and/or urea solutions.

As regards the positioning of the apparatus of the invention in, for example, large firing plants such as waste incineration plants or combined heat-power stations, the apparatus is generally located downstream, in particular directly downstream, of a combustion apparatus, in particular a combustion vessel. It has been found to be useful for the apparatus to be arranged between a combustion apparatus and a heat exchange apparatus. This arrangement enables the high temperatures required for carrying out the process of the invention to be reached.

As regards the further structure of the apparatus of the invention, it can be provided for the purposes of the present invention for the apparatus to have at least one water reservoir for stocking and/or supplying water. Here, it is likewise possible for the water reservoir to be assigned to the reactor, preferably connected to the atomized introduction devices via at least one feed line.

In addition, it is possible for the apparatus to have at least one gas reservoir for stocking and/or supplying optionally compressed gases, in particular compressed air. Here, it is possible for the gas reservoir to be assigned to the reactor, preferably connected to the atomized introduction devices via at least one feed line. The water reservoir has, in particular, the purpose of mixing further process water into the reducing agents or the mixtures of reducing agents in order to obtain an ideal concentration of reducing agents for the respective penetration depth into the flue gas stream. As an alternative to a water reservoir, it is also possible for a simple, pressurized water line to be present. The gas reservoir serves, in particular, for generating and storing the pressure required for the atomized introduction.

It is consequently also possible, for the purposes of the present invention, for the pressurization of the atomized introduction devices in order to discharge the reducing agents into the reactor to be able to be carried out by means of the gases stored in the gas reservoir.

As stated above in connection with the process of the invention, it is often advantageous for the reducing agents to be mixed before introduction into the offgases.

In a particular embodiment of the present invention, the apparatus of the invention therefore has at least one metering and/or mixing device.

In this context, it has been found to be useful and advantageous for the metering and/or mixing device to be connected to the reservoirs for the reducing agents and to the atomized introduction devices and optionally also to the optionally present water reservoir.

It is possible here for the metering and/or mixing device to be connected directly or indirectly, i.e. via further intermediate devices or feed lines, to the further devices. The ratios of the individual reducing agents to one another and the concentrations thereof in the mixture sprayed into the reactor can thus be set in the metering and/or mixing device.

For the purposes of the present invention it has been found to be particularly advantageous for the metering and/or mixing device to be configured so that the weight and/or volume ratios of the reducing agents to one another, in particular the weight and/or volume ratios of mixtures of the reducing agents, and/or the concentrations of the aqueous solutions of the reducing agents, can be regulated identically and/or can be regulated individually for individual, in particular for each atomized introduction device and/or for groups of atomized introduction devices, preferably for each atomized introduction device.

As stated above in the description of the process of the invention, it is possible to operate the apparatus of the invention at temperatures in the range from 750 to 1250° C., in particular from 800 to 1150° C., preferably from 850 to 1250° C.

Furthermore, it is possible for the introduction of the reducing agents into the offgas stream to be able to be controlled via measurement of temperatures of the offgases and/or via measurement of a temperature profile of the offgases and/or via a load signal and/or via a comparison between a measured value for the residual nitrogen oxide content of the pure gas obtained after the treatment and a prescribed intended value.

As regards the process control of the process of the invention, the apparatus can have at least one measurement device for measuring temperatures of the offgases and/or for measuring a temperature profile of the offgases and/or for measuring a load signal and/or for measuring a value for the residual nitrogen oxide content of the pure gas obtained after the treatment, in particular for the purposes of controlling the introduction of the reducing agents into the offgas stream.

In this context, it has been found to be particularly advantageous for the apparatus to have, in particular upstream of the atomized introduction devices, a measurement device for determining the temperature of the offgas and/or for measuring a temperature profile of the offgas, in particular by means of acoustic or optical temperature measurement, preferably by means of acoustic temperature measurement.

For further details regarding the apparatus or plant of the invention, reference may be made to what has been said above in respect of the process of the invention, which applies analogously to the apparatus or plant of the invention.

The process of the invention and the apparatus or plant of the invention for treating nitrogen oxide-containing offgases from industrial processes are illustrated by way of example and in a nonlimiting manner in the accompanying figures.

Further advantages, properties, aspects and features of the present invention may be derived from the following description of embodiments which are preferred according to the invention and are shown in the drawing.

The single FIGURE (FIG. 1) schematically shows the apparatus 1 according to the invention for carrying out a process according to the invention.

The FIGURE shows a reactor 2 for carrying out the process of the invention for treating nitrogen oxide-containing offgases from industrial processes. The apparatus of the invention is usually installed downstream of a firing vessel 8, for example the firing vessel of a waste incineration plant or a combined heat-power station, and is located directly upstream of the heat exchangers 9 in which the heat evolved in the combustion is removed from the flue gases and is passed to further utilization.

The reactor 2 has a plurality of atomized introduction devices 3 which, in the depiction of the figure, are arranged for the sake of clarity in five atomized introduction planes. Furthermore, the reactor 2 has a system for acoustic gas temperature measurement 13/13A which is arranged directly upstream of the atomized introduction lances 3 for the atomized introduction of the reducing agents into the flue gas stream. As an alternative, the temperature measurement can also be carried out between individual atomized introduction planes or via a plurality of systems for acoustic gas temperature measurement 13/13A. On the basis of the temperature profile of the offgas stream determined by the temperature measurement, the composition of the reducing agent sprayed into the reactor and the atomized introduction pressure and the droplet size can be set in a targeted way.

The atomized introduction devices 3 are connected via a feed line 11A to a reservoir 11 for compressed air.

Furthermore, the atomized introduction devices 3 are connected to a mixing apparatus 12 which is connected via the supply lines 6A and 7A to the stock vessels 6 and 7, respectively, which contain the reducing agents (ammonia) and 5 (urea) in the form of their aqueous solutions. Furthermore, the mixing apparatus 12 is connected via the feed line 10A to the reservoir 10 for water.

However, as an alternative, it is also possible for not only the stock vessels 6 and 7 for the storage or supply of the reducing agents and the stock vessel 10 for the storage or supply of water to be connected to the mixing apparatus 12 but for the reservoir 11 for the supply of compressed air also to be connected to the mixing apparatus 12.

As a departure from the figure, the mixing apparatus 12 can preferably be connected not only via a supply line to the atomized introduction lances 3 but also via a plurality of supply lines, in particular at least each atomized introduction plane of atomized introduction lances 3 can be connected via at least one dedicated supply line to the mixing apparatus 12. For reasons of clarity, however, the depiction of a plurality of supply lines has been omitted in the figure.

For the purposes of the process of the invention, a base setting for the metered introduction or addition of the reducing agents into the reactor 2 is preferably selected on the basis of the load signal from the firing vessel.

The ratios of ammonia solution and urea solution to one another are set in the mixing apparatus 12 on the basis of a temperature profile of the flue gas stream measured by means of acoustic gas temperature measurement with the aid of the measurement devices 13/13A and the concentration of the reducing agents on introduction into the reactor is determined by addition of process water.

As an alternative to the scheme depicted in the figure, it is also possible and preferred according to the invention for the respective ratios of ammonia solution to urea solution and also the total concentration of the reduction solution in the solution which is introduced in atomized form into the reactor to be set individually for each atomized introduction device.

Compressed air is then supplied to the respective atomized introduction lances via the supply line 11A, by means of which the respective exit pressure and thus the penetration depth and droplet size of the reducing agent solution can be set in a targeted manner. As an alternative, it is possible in this case, too, to allow the compressed air regulation likewise to be determined together with the mixing of the reducing agents via a measurement and metering device.

Further embodiments, modifications, variations and special features of the present invention can readily be recognized and implemented by a person skilled in the art on reading the description, without going outside the scope of the present invention.

The present invention will be illustrated by the following examples, without restricting the present invention thereto.

EXAMPLES

To illustrate the effectiveness of the process of the invention and also of the apparatus of the invention, the subject matter of the present invention will be illustrated with the aid of the following examples. The process is operated according to the invention in an apparatus as is shown schematically and illustratively in the single figure.

The reduction according to the invention of nitrogen oxides in flue gases is demonstrated for a coal-fired vessel of the prior art at full load (200 $MW_{el}$). An apparatus according to the invention for reducing the nitrogen oxide content of flue gases is installed between the vessel and the heat exchangers of the plant. The apparatus according to the invention consists of a reaction space (reactor) into which aqueous ammonia (25% by weight of $NH_3$, based on the aqueous ammonia), urea solution (40% by weight of urea, based on the solution) and mixtures of the two liquids can be introduced in atomized form via 60 atomized introduction lances distributed over 5 atomized introductions planes each having 12 atomized introduction lances. An acoustic temperature measurement system is installed directly upstream of the first atomized introduction plane and makes it possible to set a temperature profile of the flue gas stream and in this way control the atomized introduction lances.

At the beginning of the process and also at regular intervals during the course of the process, the nitrogen oxide loading of the raw gas, i.e. the offgas which has not yet been treated, is measured in order to allow, in combination with the load signal, a rough adjustment of the offgas treatment apparatus and the process parameters.

During the entire further course of the process, the nitrogen oxide loading of the treated offgases (i.e. the pure gases) and the ammonia breakthrough are determined so as to enable fine adjustment of the process of the invention or the apparatus of the invention.

A number of trials are carried out: firstly, two processes which are not according to the invention and are based only on the use of ammonia solution or of urea solution are carried out. Process runs are subsequently carried out according to the process of the invention using a combination of ammonia solution and urea solution. Here, the ratios of ammonia solution to urea solution are in each case varied within different ranges. In none of the trials are the aqueous solutions of the reducing agents admixed with additional water. The results of the process runs are summarized in Table 1.

As can be seen from the data in Table 1, both the sole atomized introduction of urea and the sole atomized introduction of ammonia solution give a reduction in the nitrogen oxide content of the offgases corresponding to the present legal limits. However, the sole atomized introduction of ammonia leads to increased ammonia breakthrough since the ammonia vaporizes immediately after exit from the nozzles and thus only partly comes into contact with the nitrogen oxides in the desired temperature range. The sole use of urea results in a significantly improved (reduced) ammonia breakthrough, but leads to noticeable corrosion on the heat exchangers since, particularly at high loads of the vessel, atomized introduction in the region of the heat exchangers becomes necessary in order to decrease the nitrogen oxide content of the flue gases to the desired level.

Compared to the abovementioned processes which are not according to the invention, the three process runs according to the invention display a significant efficiency in the purification of the flue gases, i.e. the nitrogen oxide content of the treated offgases is significantly lower compared to the processes which are not according to the invention. Furthermore, the ammonia breakthrough is also significantly reduced in the processes according to the invention, and no corrosion is observed in the region of the heat exchangers.

Very good results are obtained when the ratio of ammonia to urea is varied in the range from 1:99 to 99:1, with the best results being obtained when the ratio of ammonia to urea is from 20:80 to 80:20. In this range and even at ammonia/urea ratios of from 10:90 to 90:10, the process of the invention gives degrees of nitrogen oxide removal which can otherwise be achieved only when using catalytic processes.

TABLE 1

| Reducing agent | Ratio of $NH_3$: Urea | $NO_x$ raw gas mg/standard $m^3$ | $NO_x$ pure gas mg/standard $m^3$ | $dNO_x$ mg/standard $m^3$ | $NH_3$ breakthrough mg/standard $m^3$ | Corrosion |
|---|---|---|---|---|---|---|
| $NH_3$* | 100% of $NH_3$ | 385 | 195 | 190 | 14.3 | No |
| Urea* | 100% of urea | 390 | 187 | 203 | 8.9 | Yes |
| $NH_3$/urea | 1:99 to 99:1 | 387 | 123 | 264 | 6.2 | No |
| $NH_3$/urea | 10:90 to 90:10 | 382 | 101 | 281 | 5.4 | No |
| $NH_3$/urea | 20:80 to 80:20 | 391 | 94 | 297 | 4.9 | No |

*not according to the invention

The invention claimed is:

1. A process for removing nitrogen oxides from offgases from industrial plants, wherein at least two different nitrogen-containing reducing agents are brought into contact with the nitrogen oxide-containing offgases and/or are introduced into the stream of the nitrogen oxide-containing offgases,
wherein ammonia and urea in the form of their aqueous solutions are used as different reducing agents,
wherein the reducing agents are introduced in atomized form into the offgas stream by means of atomizing introduction lances,
wherein at least one temperature profile of the offgases in the form of a plane is determined, and
wherein the atomizing introduction lances are controlled individually or in groups on the basis of the measured temperature profile of the offgases.

2. The process according to claim 1, wherein the process is carried out in the absence of a catalyst and wherein the process is carried out as a selective noncatalytic reduction.

3. The process according to claim 1, wherein ammonia is provided in the form of an aqueous solution containing from 10 to 35% by weight of $NH_3$, based on the solution; and wherein urea is provided in the form of an aqueous solution containing from 10 to 50% by weight of urea, based on the solution.

4. The process according to claim 1, wherein the different reducing agents are introduced at different times and/or physically separately into the offgas stream; or wherein the different reducing agents are introduced together into the offgas stream.

5. The process according to claim 1, wherein ammonia and urea are introduced in a weight ratio of ammonia/urea of from 99:1 to 1:99 into the offgas stream.

6. The process according to claim 1, wherein the reducing agents are introduced into the offgas stream by means of atomizing introduction lances with each atomizing introduction lance having one or more nozzles for introducing the reducing agents into the offgas stream, wherein the atomizing introduction lances are arranged in from 1 to 10 atomizing introduction planes.

7. The process according to claim 1, wherein the process is carried out at temperatures in the range from 750 to 1,200° C.; and wherein the introduction of the reducing agents into the offgas stream is controlled via determination of the offgas temperature and/or the residual nitrogen oxide content of the pure gas obtained after the treatment.

8. The process according to claim 1, wherein at least one temperature profile of the offgases is determined by means of acoustic and/or optical temperature measurement; and wherein the offgas stream is divided into sections on the basis of the measured temperatures of the offgases and/or the measured temperature profile of the offgases, with defined individual atomizing introduction lances and/or defined groups of atomizing introduction lances being assigned to the sections.

9. The process according to claim 1, wherein the atomizing introduction lances are controlled on the basis of the measured temperature profile of the offgases and/or the load signal and/or a comparison between a measured value for the residual nitrogen oxide content of the pure gas obtained after the treatment and a prescribed intended value.

10. The process according to claim 1, wherein the weight ratios of the reducing agents and/or the concentrations of the aqueous solutions of the reducing agents are set to identical values for all atomizing introduction lances and/or are set individually for individual atomizing introduction lances and/or for groups of atomizing introduction lances; and wherein the reducing agents are introduced into the offgas stream in such amounts that the molar ratio of the total reducing agents used to the nitrogen oxides to be reduced is set in the range from 1:1 to 5:1.

11. An apparatus for removing nitrogen oxides from offgases from industrial plants, wherein the apparatus comprises:
(a) a reactor for contacting and/or reacting at least two different reducing agents with the nitrogen oxide-containing offgases, where the reactor has a plurality of atomizing introduction lances configured for the atomized introduction of aqueous ammonia and urea solutions, where the atomizing introduction lances can be regulated individually and/or in groups,
(b) at least one first reservoir for stocking and/or supplying at least one first reducing agent, which is assigned to the reactor and connected via at least one feed line to the atomizing introduction lances, and
(c) at least one second reservoir for stocking and/or supplying at least one second reducing agent, which is different from the first reducing agent, which is assigned to the reactor and connected via at least one feed line to the atomizing introduction lances,
wherein the introduction of the reducing agents into the offgas stream can be controlled via measurement of a temperature profile of the offgases,
wherein the apparatus has at least one measurement device for measuring a temperature profile of the offgases for the purposes of controlling the introduction of the reducing agents into the offgas stream.

12. The apparatus according to claim 11, wherein the outflow of the reducing agents from the atomizing introduction lances can be regulated individually for each atomizing introduction lance and/or for groups of atomizing introduction lances; and wherein each atomizing introduction lance has one or more nozzles; and wherein the apparatus has from 1 to 200 atomizing introduction lances.

13. The apparatus according to claim 11, wherein the atomizing introduction lances are arranged in from 1 to 10 atomizing introduction planes, with each atomizing introduction plane having from 1 to 20 atomizing introduction lances; and wherein the apparatus is located downstream of a combustion apparatus.

14. The apparatus according to claim 11, wherein the apparatus has at least one water reservoir for stocking and/or supplying water, with the water reservoir being connected to the atomizing introduction lances via at least one feed line.

15. The apparatus according to claim 11, wherein the apparatus can be operated at temperatures in the range from 750 to 1,200° C.; and wherein the introduction of the reducing agents into the offgas stream can be controlled via measurement of temperatures of the offgases and/or via measurement of a temperature profile of the offgases and/or via a load signal and/or via a comparison between a measured value for the residual nitrogen oxide content of the pure gas obtained after the treatment and a prescribed intended value.

16. The apparatus according to claim 11, wherein the apparatus has at least one measurement device for measuring temperatures of the offgases and/or for measuring a temperature profile of the offgases and/or for measuring a load signal and/or for measuring a value for the residual nitrogen oxide content of the pure gas obtained after the treatment, in particular for the purposes of controlling the introduction of the reducing agents into the offgas stream.

17. The apparatus according to claim 11, wherein the apparatus has a measurement device for determining the temperature of the offgas and/or for measuring a temperature profile of the offgas.

18. The apparatus according to claim 17, wherein the measurement device is an acoustic or optical temperature measurement device.

* * * * *